(12) United States Patent
Wang

(10) Patent No.: US 9,715,859 B2
(45) Date of Patent: Jul. 25, 2017

(54) LCD PANEL OF DOT INVERSION MODE

(71) Applicant: Wuhan China Star Optoelectronics Technology Co., Ltd., Wuhan (CN)

(72) Inventor: Cong Wang, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 35 days.

(21) Appl. No.: 14/913,373

(22) PCT Filed: Jan. 29, 2016

(86) PCT No.: PCT/CN2016/072649
§ 371 (c)(1),
(2) Date: Feb. 21, 2016

(87) PCT Pub. No.: WO2017/096705
PCT Pub. Date: Jun. 15, 2017

(65) Prior Publication Data
US 2017/0169774 A1    Jun. 15, 2017

(30) Foreign Application Priority Data
Dec. 11, 2015  (CN) .......................... 2015 1 0926246

(51) Int. Cl.
*G09G 5/00* (2006.01)
*G09G 3/36* (2006.01)
(Continued)

(52) U.S. Cl.
CPC ......... *G09G 3/3614* (2013.01); *G02F 1/1368* (2013.01); *G02F 1/136286* (2013.01);
(Continued)

(58) Field of Classification Search
CPC ............... G09G 3/3614; G09G 3/3648; G09G 2310/0297; G09G 2330/021;
(Continued)

(56) References Cited

U.S. PATENT DOCUMENTS

2009/0231363 A1* 9/2009 Liu ...................... G09G 3/3688
345/690
2009/0289878 A1* 11/2009 Chen .................... G09G 3/3688
345/87

(Continued)

*Primary Examiner* — Adam R Giesy
*Assistant Examiner* — Chineyere Wills-Burns
(74) *Attorney, Agent, or Firm* — Leong C. Lei

(57) ABSTRACT

The invention provides an LCD panel of dot inversion mode; without changing source driving power-consumption, adjusting the routing inside LCD panel: for even numbers n, the adjacent (n−1)-th gate scan line (G(n−1)) and n-th gate scan line (G(n)) are disposed closely, with TFTs of (n−1)-th column located above (n−1)-th gate scan line (G(n−1)), and TFTs of n-th column located below n-th gate scan line (G(n)); the gates of part of the TFTs of (n−1)-th column and n-th column are connected to (n−1)-th gate scan line (G(n−1)), and the gates of part of TFTs of the (n−1)-th column and n-th column are connected to n-th gate scan line (G(n)); with a jumper design on the end of a de-multiplexer to change the parity inversion mode of LCD panel to achieve dot inversion. As such, the invention overcomes the flicker and crosstalk problems and improve LCD panel display quality.

9 Claims, 18 Drawing Sheets

(51) Int. Cl.
*G02F 1/1362* (2006.01)
*G02F 1/1368* (2006.01)

(52) U.S. Cl.
CPC ... *G09G 3/3648* (2013.01); *G09G 2300/0452* (2013.01); *G09G 2310/0297* (2013.01); *G09G 2310/08* (2013.01); *G09G 2320/0209* (2013.01); *G09G 2320/0247* (2013.01); *G09G 2330/021* (2013.01)

(58) Field of Classification Search
CPC ....... G09G 2310/08; G09G 2320/0209; G09G 2320/0247; G09G 2300/0452; G02F 1/136286; G02F 1/1368
USPC ......................................................... 345/209
See application file for complete search history.

(56) References Cited

U.S. PATENT DOCUMENTS

| | | | | |
|---|---|---|---|---|
| 2010/0149151 | A1* | 6/2010 | Nam | G09G 3/3614 345/211 |
| 2010/0182333 | A1* | 7/2010 | Chiang | G09G 3/36 345/589 |
| 2012/0162171 | A1* | 6/2012 | Chaing | G09G 3/3648 345/209 |
| 2013/0300722 | A1* | 11/2013 | Gyouten | G09G 3/3648 345/204 |
| 2016/0322008 | A1* | 11/2016 | Sang | G09G 3/3275 |

\* cited by examiner

Fig. 22

LCD PANEL OF DOT INVERSION MODE

BACKGROUND OF THE INVENTION

1. Field of the Invention

The present invention relates to the field of display, and in particular to an LCD display panel of dot inversion mode.

2. The Related Arts

The liquid crystal display (LCD) has the advantages of thin, energy-saving, radiation-free, and is widely applied to, such as, liquid crystal (LC) TV, mobile phone, personal digital assistant (PDA), digital camera, computer monitor or notebook computer monitor, and dominates the tablet display market.

In the known LCDs, the majority is of the backlight type, comprising LCD panel and the backlight module. The operation theory behind the LCD panel is to fill the LC molecules into between a thin film transistor (TFT) array substrate and a color filter (CF) substrate, and apply a driving voltage between the two substrates to control the rotation of the LC molecules to refract the light from the backlight module.

The LCD panel comprises various pixel arrangements of array forms. As the technology progresses, each pixel evolves from comprising a red (R) sub-pixel, a green (G) sub-pixel, and a blue (B) sub-pixel to comprising a red (R) sub-pixel, a green (G) sub-pixel, a blue (B) sub-pixel, and a white (W) sub-pixel, also known as WRGB pixel structure. Each sub-pixel is connected to a TFT, and the gate of the TFT is connected to a horizontal scan line, the drain is connected to a data line in the vertical direction and the source is connected to a pixel electrode. When a sufficient voltage is applied to the horizontal scan line, the TFT connected to the scan line will turn on so that the signal voltage on the data line can be written into the sub-pixels to control the transmittance of the LC to achieve displaying.

The known driving method for LCD panel usually comprises: frame inversion mode, line inversion mode and dot inversion mode, wherein the dot inversion mode refer to that, in each frame, each sub-pixel has a voltage parity different from the adjacent surrounding four sub-pixels. In dot inversion mode, the LCD panel suffers the least flicker and crosstalk problems and shows the best displaying result.

In the known manufacturing process for WRGB pixel structure, to reduce the number of pins of source IC and the fan-out lines, a de-multiplexer (demux) is often used in design to allocate a fan-out line to a plurality of data lines, and uses the timing of demux to control the data line of the active area. However, such design results in the plurality of data lines under the control of a fan-out line has the same parity. As the LC realizes frame inversion mode during the parity inversion process, the above design will cause severe flickering in the panel, especially for WRGB pixel structure wherein a fan-out line is allocated to four data lines, often leading to crosstalk situation and severely affecting the display. A common solution is to use a jumper design at the end of the demux to change the scan manner of the gate scan line from column-by-column to turning on the gate lines for odd-numbered columns first, followed by turning on the gate lines for the even-numbered columns. As such, the parity inversion of the panel is changed; however, this solution is not exactly dot inversion by definition.

Refer to FIG. 1. The known LCD panel usually arranges the horizontal gate scan lines with equal intervals between two adjacent lines. For a positive number n, the n-th column TFTs are all located below the corresponding n-th gate scan line G(n). Refer to FIG. 2 the demux 1 controlling the data lines shown in FIG. 1 comprises four routings 11, 12, 13, 14, and a plurality of control switch sets, with each control switch sets comprising four TFTs T100, T200, T300, T400. The gates of the four TFTs of the same control switch set are connected together to a routing, the sources connected together to a fan-out line 2, and the drains connected together to a data line. Two adjacent fan-out lines 2 have the opposite voltage parities. A jumper is used at the end of the demux 1. For two adjacent switch control sets, the drain of the second TFT T200 of the left set jumps to connect the sixth data line D6, the drain of the third TFT T300 of the left set jumps to connect the seventh data line D7, the drain of the second TFT T200 of the right set jumps to connect the second data line D2, the drain of the third TFT T300 of the right set jumps to connect the third data line D3.

In the timing control of FIG. 3, the gate scan lines are scanned line-by-line. Because the four data lines controlled by the same fan-out line 2 have the same voltage parity, the above conventional display effect of the panel is as shown in FIG. 4, wherein the first, fourth, sixth and seventh sub-pixels have positive parity, and the second, third, fifth and eighth sub-pixel have negative parity.

In the timing control of FIG. 5, the odd-numbered gate scan lines of the m-th frame are turned on line-by-line first, following by the even-numbered gate scan lines. As shown in FIG. 6, in two adjacent frames, the voltage parity of the same fan-out line is opposite, and the display effect for two adjacent frames in conventional panel is stacked up as shown in FIG. 7. Although the dot inversion is achieved among each row of pixels, the dot inversion does not show up in each column of pixels. By definition, the strict dot inversion is not achieved.

SUMMARY OF THE INVENTION

The object of the present invention is to provide an LCD panel of dot inversion mode; without changing the source driving power-consumption, through adjusting the routing inside the LCD panel, the parity inversion mode of the LCD panel is changed to achieve dot inversion mode to improve the LCD panel display quality.

To achieve the above object, the present invention provides a liquid crystal display (LCD) panel of dot inversion mode. Optionally, the LCD panel of dot inversion mode of the present invention comprises a plurality of parallel horizontal gate scan lines, a plurality of parallel vertical data lines a plurality of thin film transistors (TFT) arranged in an array to drive corresponding sub-pixels, and a de-multiplexer (demux); for a positive number s, the TFTs of the s-th rows having sources connected to the s-th data line; for an even number n, the adjacent (n−1)-th gate scan line and the n-th gate scan line being disposed closely with TFTs of the (n−1)-th column located above the (n−1)-th gate scan line, and TFTs of the n-th column located below the n-th gate scan line; every eight rows of the same column of TFTs being grouped as a set from left to right, the gates of the first, second, seventh and eighth TFTs of the (n−1)-th column connected to the (n−1)-th gate scan line, and the gates of the third, fourth, fifth and sixth TFTs of the (n−1)-th column connected to the n-th gate scan line; the gates of the first, second, seventh and eighth TFTs of the n-th column connected to the n-th gate scan line, and the gates of the third, fourth, fifth and sixth TFTs of the n-th column connected to the (n−1)-th gate scan line; the demux comprising a first routing, a second routing, a third routing, and a fourth routing, and a plurality of control switch sets; each control switch set comprising, from left to right, a first switch TFT, a second switch TFT, a third switch TFT and a fourth switch TFT, the gates of the four switch TFTs of the same switch control set connected together to a routing, the sources connected together to a fan-out line, the drains connected together to a data line; two adjacent fan-out lines having opposite voltage parities; every two adjacent switch control sets of the demux corresponding to the eight data lines, arranged from left to right; a jumper design disposed at the end of the demux, with respect to the two switch control sets, the drain of the first switch TFT of the left switch control set connected correspondingly to the first data line, the drain of the second switch TFT jumped to connect to the seventh data line, the drain of the third switch TFT jumped to connect to the sixth data line, the drain of the fourth switch TFT jumped to connect corresponding to the fourth data line; the drain of the first switch TFT of the right switch control set connected correspondingly to the fifth data line, the drain of the second switch TFT jumped to connect to the third data line, the drain of the third switch TFT jumped to connect to the second data line, the drain of the fourth switch TFT jumped to connect corresponding to the eighth data line.

For a positive integer m, the odd-numbered gate scan lines of the m-th frame are turned on line-by-line, following by the even-numbered gate scan lines of the (m+1)-th frame turned on line-by-line; in two adjacent frames, the same fan-out line has opposite parities.

The sub-pixels comprise a red sub-pixel, a green sub-pixel, a blue sub-pixel, and a white sub-pixel.

Optionally, the LCD panel of dot inversion mode of the present invention comprises a plurality of parallel horizontal gate scan lines, a plurality of parallel vertical data lines a plurality of thin film transistors (TFT) arranged in an array to drive corresponding sub-pixels, and a de-multiplexer (demux); for a positive number s, the TFTs of the s-th rows having sources connected to the s-th data line; for an even number n, the adjacent (n−1)-th gate scan line and the n-th gate scan line being disposed closely with TFTs of the (n−1)-th column located above the (n−1)-th gate scan line, and TFTs of the n-th column located below the n-th gate scan line; every eight rows of the same column of TFTs being grouped as a set from left to right, the gates of the first, second, third and fourth TFTs of the (n−1)-th column connected to the (n−1)-th gate scan line, and the gates of the fifth, sixth, seventh, and eighth TFTs of the (n−1)-th column connected to the n-th gate scan line; the gates of the first, second, third, and fourth TFTs of the n-th column connected to the n-th gate scan line, and the gates of the fifth, sixth, seventh, and eighth TFTs of the n-th column connected to the (n−1)-th gate scan line; the demux comprising a first routing, a second routing, a third routing, and a fourth routing, and a plurality of control switch sets; each control switch set comprising, from left to right, a first switch TFT, a second switch TFT, a third switch TFT and a fourth switch TFT, the gates of the four switch TFTs of the same switch control set connected together to a routing, the sources connected together to a fan-out line, the drains connected together to a data line; two adjacent fan-out lines having opposite voltage parities; every two adjacent switch control sets of the demux corresponding to the eight data lines, arranged from left to right; a jumper design disposed at the end of the demux, with respect to the two switch control sets, the drain of the first switch TFT of the left switch control set connected correspondingly to the first data line, the drain of the second switch TFT jumped to connect to the sixth data line, the drain of the third switch TFT connected correspondingly to the third data line, the drain of the fourth switch TFT jumped to connect to the eighth data line; the drain of the first switch TFT of the right switch control set connected correspondingly to the fifth data line, the drain of the second switch TFT jumped to connect to the second data line, the drain of the third switch TFT connected correspondingly to the seventh data line, the drain of the fourth switch TFT jumped to connect to the fourth data line.

For a positive integer m, the odd-numbered gate scan lines of the m-th frame are turned on line-by-line, following by the even-numbered gate scan lines of the (m+1)-th frame turned on line-by-line; in two adjacent frames, the same fan-out line has opposite parities.

The sub-pixels comprise a red sub-pixel, a green sub-pixel, a blue sub-pixel, and a white sub-pixel.

Optionally, the LCD panel of dot inversion mode of the present invention comprises a plurality of parallel horizontal gate scan lines, a plurality of parallel vertical data lines a plurality of thin film transistors (TFT) arranged in an array to drive corresponding sub-pixels, and a de-multiplexer (demux); for a positive number s, the TFTs of the s-th rows having sources connected to the s-th data line; for an even number n, the adjacent (n−1)-th gate scan line and the n-th gate scan line being disposed closely with TFTs of the (n−1)-th column located above the (n−1)-th gate scan line, and TFTs of the n-th column located below the n-th gate scan line; every eight rows of the same column of TFTs being grouped as a set from left to right, the gates of the first, third, sixth and eighth TFTs of the (n−1)-th column connected to the (n−1)-th gate scan line, and the gates of the second, fourth, fifth, and seventh TFTs of the (n−1)-th column connected to the n-th gate scan line; the gates of the first, third, sixth and eighth TFTs of the n-th column connected to the n-th gate scan line, and the gates of the second, fourth, fifth, and seventh TFTs of the n-th column connected to the (n−1)-th gate scan line; the demux comprising a first routing, a second routing, a third routing, and a fourth routing, and a plurality of control switch sets; each control switch set comprising, from left to right, a first switch TFT, a second switch TFT, a third switch TFT and a fourth switch TFT, the gates of the four switch TFTs of the same switch control set connected together to a routing, the sources connected together to a fan-out line, the drains connected together to a data line; two adjacent fan-out lines having opposite voltage parities; every two adjacent switch control sets of the demux corresponding to the eight data lines, arranged from left to right; a jumper design disposed at the end of the demux, with respect to the two switch control sets, the drain of the first switch TFT of the left switch control set connected correspondingly to the first data line, the drain of the second switch TFT connected correspondingly to the second data line, the drain of the third switch TFT connected correspondingly to the third data line, the drain of the fourth switch TFT connected correspondingly the fourth data line; the drain of the first switch TFT of the right switch control set connected correspondingly to the fifth data line, the drain of the second switch TFT connected correspondingly to the sixth data line, the drain of the third switch TFT connected correspondingly to the seventh data line, the drain of the fourth switch TFT connected correspondingly to the eighth data line.

For a positive integer m, the odd-numbered gate scan lines of the m-th frame are turned on line-by-line, following by the even-numbered gate scan lines of the (m+1)-th frame turned on line-by-line; in two adjacent frames, the same fan-out line has opposite parities.

The sub-pixels comprise a red sub-pixel, a green sub-pixel, a blue sub-pixel, and a white sub-pixel.

Compared to the known techniques, the present invention provides the following advantages: the present invention provides an LCD panel of dot inversion mode; without changing the source driving power-consumption, adjusting the routing inside the LCD panel: for an even number n, the adjacent (n−1)-th gate scan line and the n-th gate scan line are disposed closely with TFTs of the (n−1)-th column located above the (n−1)-th gate scan line, and TFTs of the n-th column located below the n-th gate scan line; the gates of part of the TFTs of the (n−1)-th column and the n-th column are connected to the (n−1)-th gate scan line, and the gates of part of the TFTs of the (n−1)-th column and the n-th column are connected to the n-th gate scan line; in combination with the jumper design on the end of the de-multiplexer to change the parity inversion mode of the LCD panel to achieve dot inversion mode. As such, the present invention can overcome the flicker and crosstalk problems and improve the LCD panel display quality.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings:

Figure 4:
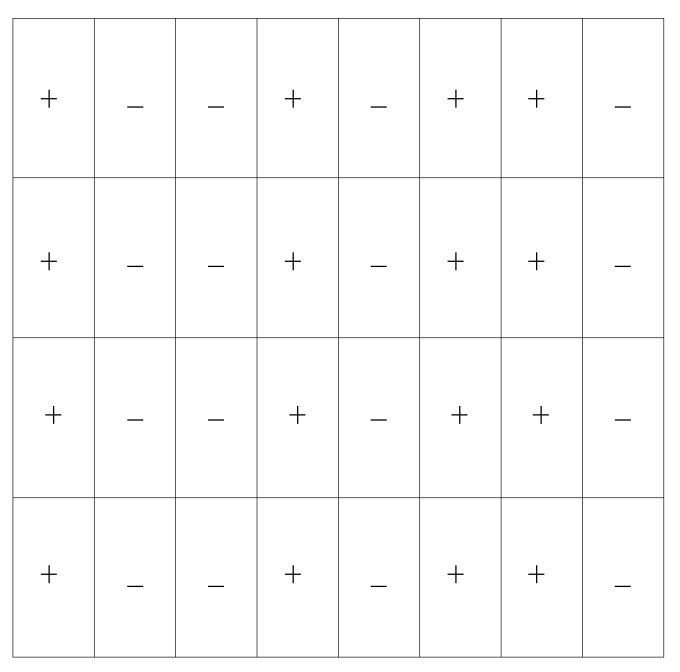

FIG. 4 is a schematic view showing the voltage parity distribution of the operation timing of the LCD panel in FIG. 3;

FIG. 10 is a schematic view showing the voltage parity of the m-th frame of the LCD panel in FIG. 8;

FIG. 11 is a schematic view showing the voltage parity of the (m+1)-th frame of the LCD panel in FIG. 8;

FIG. 12 is a schematic view showing the voltage parity after the stack up of the two adjacent frames of FIG. 10 and FIG. 11;

FIG. 15 is a schematic view showing the voltage parity of the m-th frame of the LCD panel in FIG. 13;

FIG. 16 is a schematic view showing the voltage parity of the (m+1)-th frame of the LCD panel in FIG. 13;

FIG. 17 is a schematic view showing the voltage parity after the stack up of the two adjacent frames of FIG. 15 and FIG. 16;

FIG. 20 is a schematic view showing the voltage parity of the m-th frame of the LCD panel in FIG. 18;

FIG. 21 is a schematic view showing the voltage parity of the (m+1)-th frame of the LCD panel in FIG. 18; and FIG. 22 is a schematic view showing the voltage parity after the stack up of the two adjacent frames of FIG. 20 and FIG. 21.

DETAILED DESCRIPTION OF THE PREFERRED EMBODIMENTS

To further explain the technical means and effect of the present invention, the following refers to embodiments and drawings for detailed description.

Figure 8:
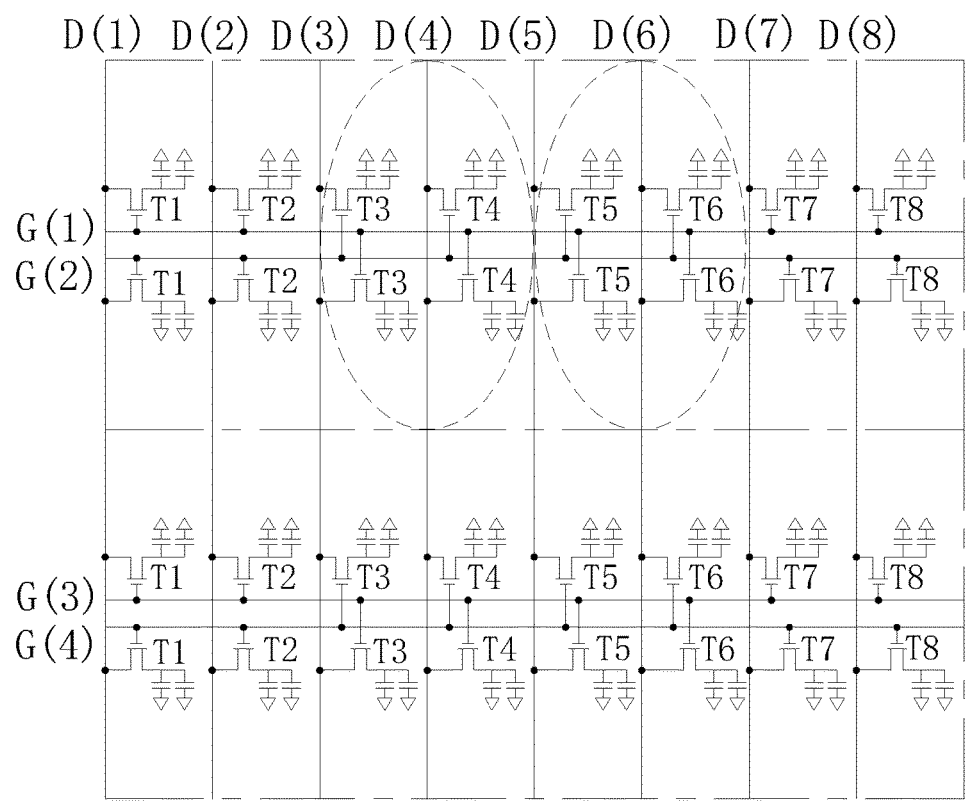
FIG. 8 is a schematic view showing the routing of the first embodiment of the dot inversion LCD panel provided by an embodiment of the present invention.
Figure 9:
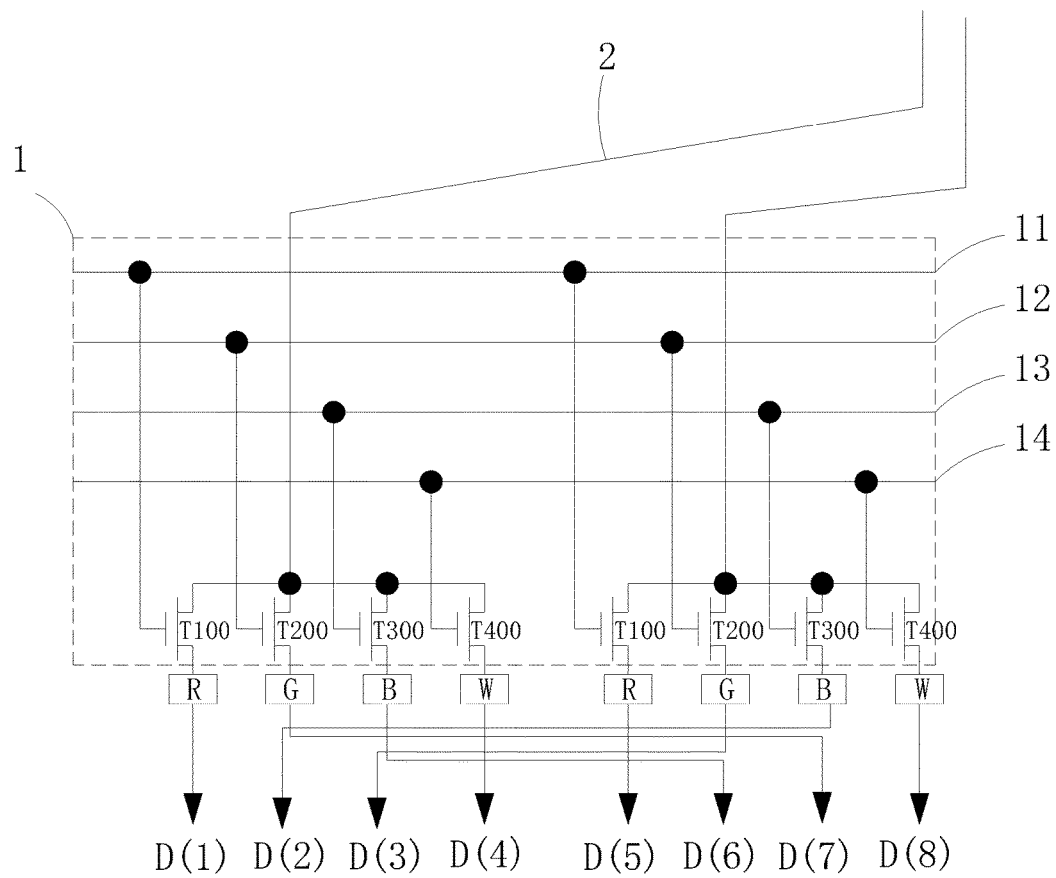
FIG. 9 is a schematic view showing the routing of the de-multiplexer of the first embodiment of the dot inversion LCD panel provided by an embodiment of the present invention.

The present invention provides an LCD panel of dot inversion mode. Refer to FIG. 8 and FIG. 9 for the first embodiment of the present invention. The LCD panel of the present invention comprises: a plurality of parallel horizontal gate scan lines, a plurality of parallel vertical data lines a plurality of thin film transistors (TFT) arranged in an array to drive corresponding sub-pixels, and a de-multiplexer (demux) 1.

As shown in FIG. 8, for a positive number s, the TFTs of the s-th rows having sources connected to the s-th data line D(s), for example, the sources of the TFTs in the first row connected correspondingly to the first data line D(1), the sources of the TFTs in the second row connected correspondingly to the second data line D(2), and so on.

For an even number n, the adjacent (n−1)-th gate scan line G(n−1) and the n-th gate scan line G(n) are disposed closely with TFTs of the (n−1)-th column located above the (n−1)-th gate scan line G(n−1), and TFTs of the n-th column are located below the n-th gate scan line G(n). For example, the first gate scan line G(1) and the second gate scan line G(2) are disposed closely with TFTs of the first column located above the first gate scan line G(1), and TFTs of the second column are located below the second gate scan line G(2) the third gate scan line G(3) and the fourth gate scan line G(4) are disposed closely with TFTs of the first column located above the third gate scan line G(3), and TFTs of the fourth column are located below the second gate scan line G(4); and so on.

Every eight rows of the same column of TFTs are grouped as a set from left to right, the gates of the first, second, seventh and eighth TFTs T1, T2, T7, T8 of the (n−1)-th column connected to the (n−1)-th gate scan line G(n−1), and the gates of the third, fourth, fifth and sixth TFTs T3, T4, T5, T6 of the (n−1)-th column connected to the n-th gate scan line G(n); the gates of the first, second, seventh and eighth TFTs T1, T2, T7, T8 of the n-th column connected to the n-th gate scan line G(n), and the gates of the third, fourth, fifth and sixth TFTs T3, T4, T5, T6 of the n-th column connected to the (n−1)-th gate scan line G(n−1). For example, the tgates of the first, second, seventh and eighth TFTs T1, T2, T7, T8 of the first column connected to the first gate scan line G(1), and the gates of the third, fourth, fifth and sixth TFTs T3, T4, T5, T6 of the first column connected to the second gate scan line G(2); the gates of the first, second, seventh and eighth TFTs T1, T2, T7, T8 of the second column connected to the second gate scan line G(2), and the gates of the third, fourth, fifth and sixth TFTs T3, T4, T5, T6 of the second column connected to the first gate scan line G(1), and so on.

As shown in FIG. 9, the demux 1 comprises a first routing 11, a second routing 12, a third routing 13, and a fourth routing 14, and a plurality of control switch sets. Each control switch set comprises, from left to right, a first switch TFT T100, a second switch TFT T200, a third switch TFT T300 and a fourth switch TFT T400, the gates of the four switch TFTs T100, T200, T300, T400 of the same switch control set connected together to a routing, the sources connected together to a fan-out line 2, the drains connected together to a data line. In other words, the gate of the first switch TFT T100 is connected to the first routing 11, the gate of the second switch TFT T200 is connected to the second routing 12, the gate of the third switch TFT T300 is connected to the third routing 13, and the gate of the fourth switch TFT T400 is connected to the fourth routing 14. Two adjacent fan-out lines 2 have opposite voltage parity.

Every two adjacent switch control sets of the demux 1 correspond to the eight data lines, arranged from left to right. A jumper design is disposed at the end of the demux 1, with respect to the two switch control sets, the drain of the first switch TFT T100 of the left switch control set connected correspondingly to the first data line D(1), the drain of the second switch TFT T200 jumped to connect to the seventh data line D(7), the drain of the third switch TFT T300 jumped to connect to the sixth data line D(6), the drain of the fourth switch TFT T400 jumped to connect corresponding to the fourth data line D(4); the drain of the first switch TFT T100 of the right switch control set connected correspondingly to the fifth data line D(5), the drain of the second switch TFT T200 jumped to connect to the third data line D(3), the drain of the third switch TFT T300 jumped to connect to the second data line D(2), the drain of the fourth switch TFT T400 connected correspondingly to the eighth data line D(8).

Specifically, the sub-pixels comprise a red sub-pixel, a green sub-pixel, a blue sub-pixel, and a white sub-pixel.

Figure 1:
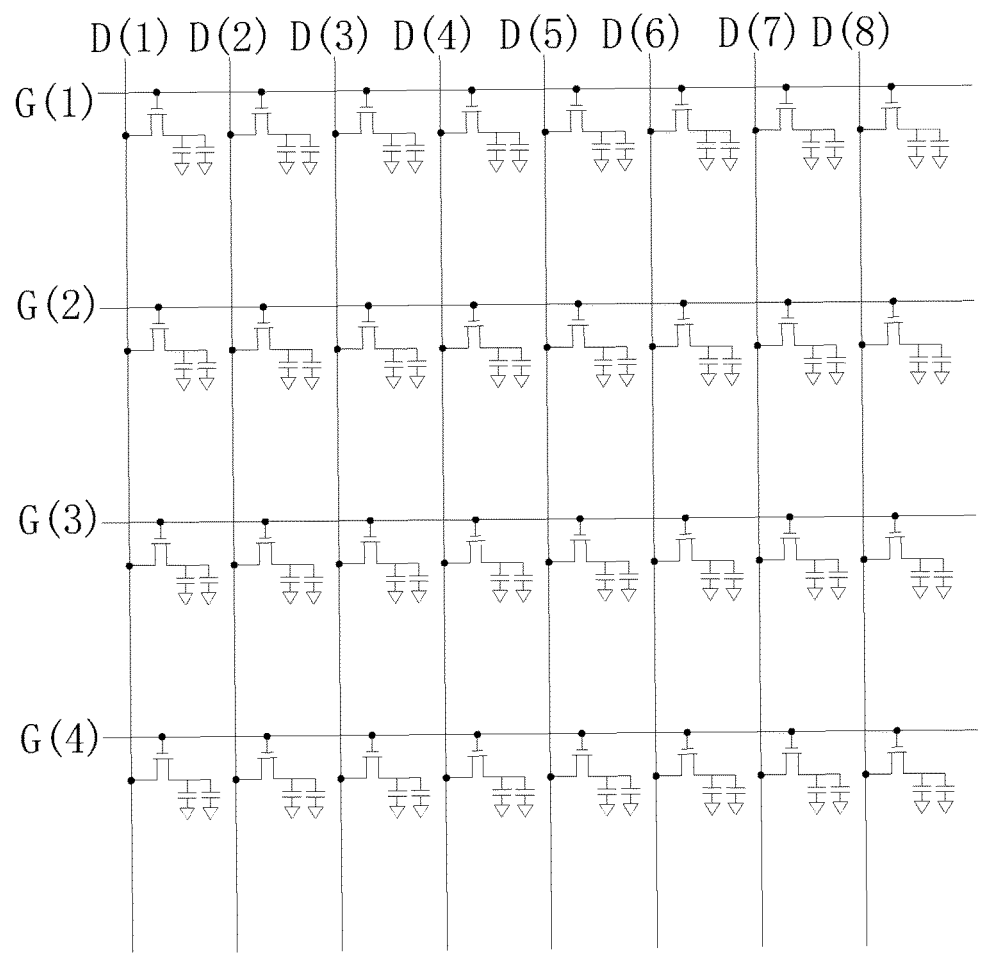
FIG. 1 is a schematic view showing the routing of a known LCD panel.
Figure 2:
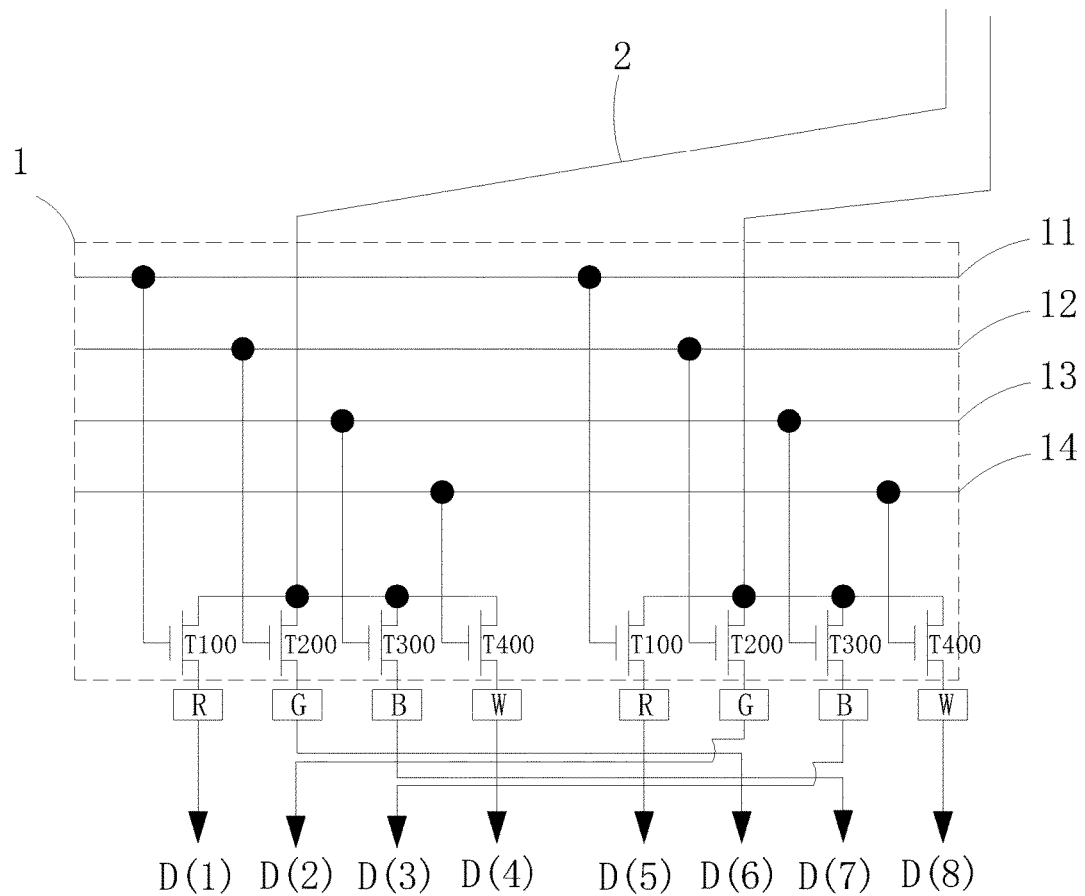
FIG. 2 is a schematic view showing the routing of de-multiplexer of the LCD in FIG. 1.
Figure 3:
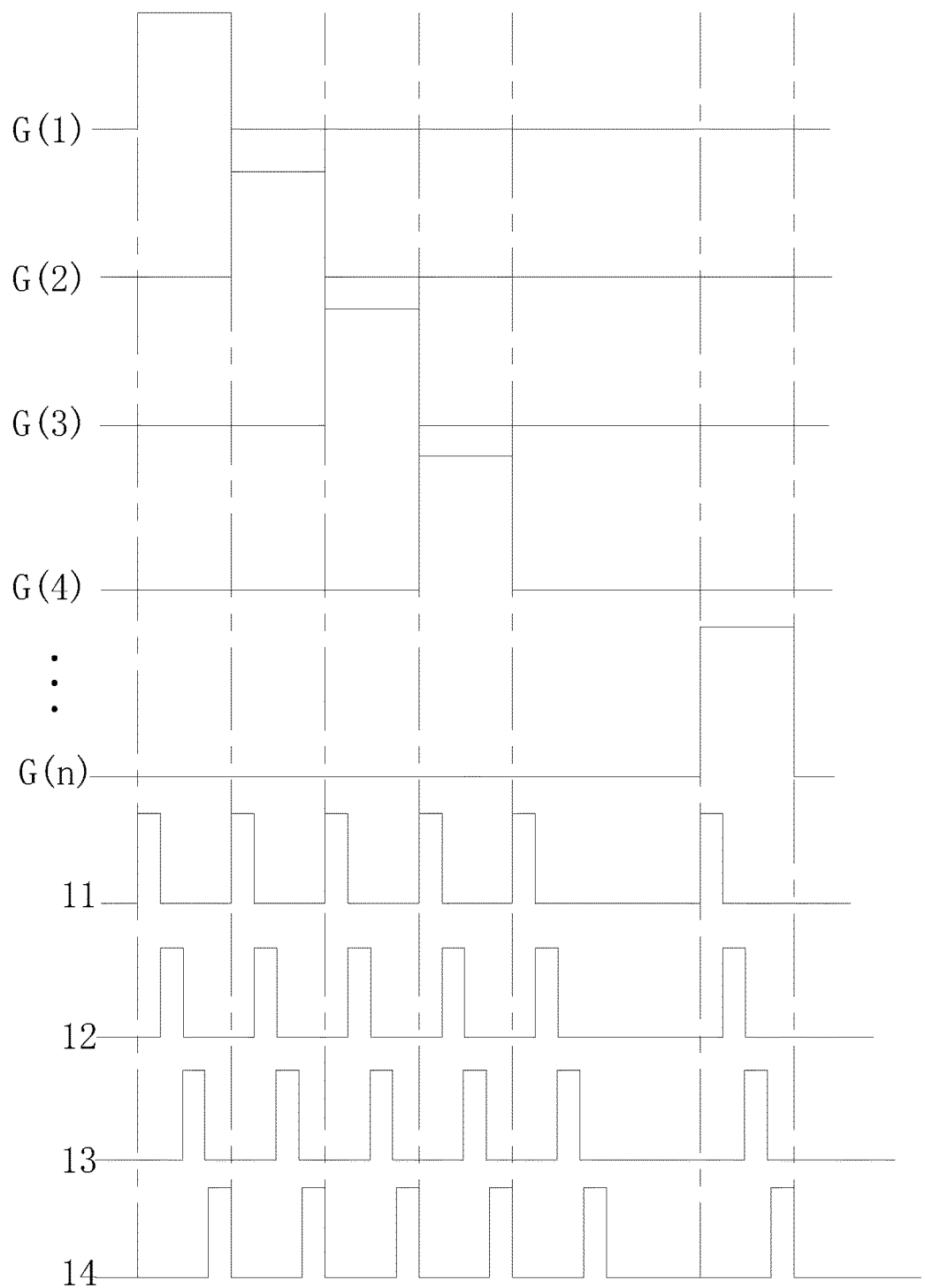
FIG. 3 is a schematic view showing the operation timing of the line-by-line scan of the gate scan line of the LCD panel in FIG. 1.
Figure 5:
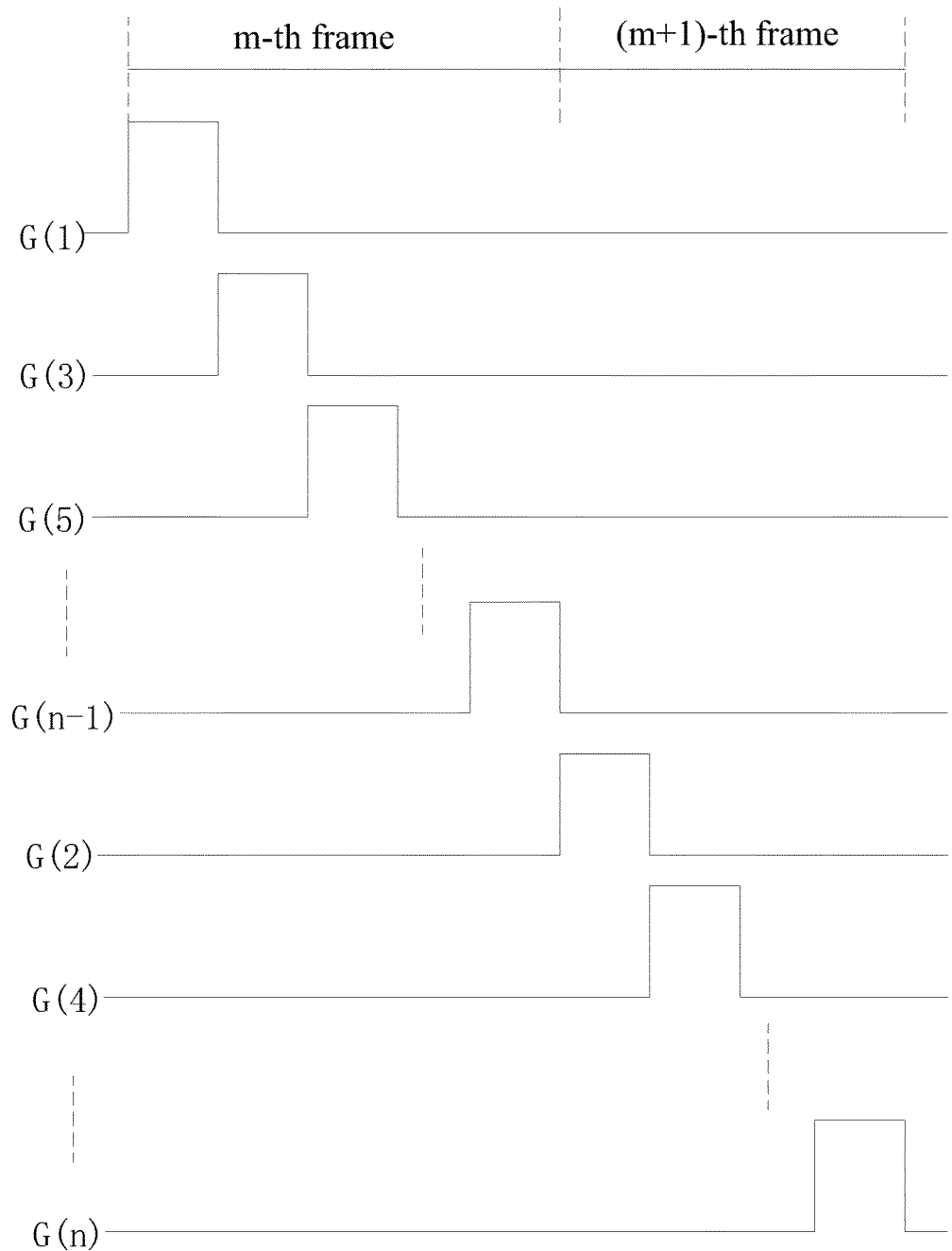
FIG. 5 is a schematic view showing the operation timing in scanning every other line manner of the LCD panel in FIG. 1, and the operation timing of a dot inversion LCD panel provided by an embodiment of the present invention.
Figure 6:
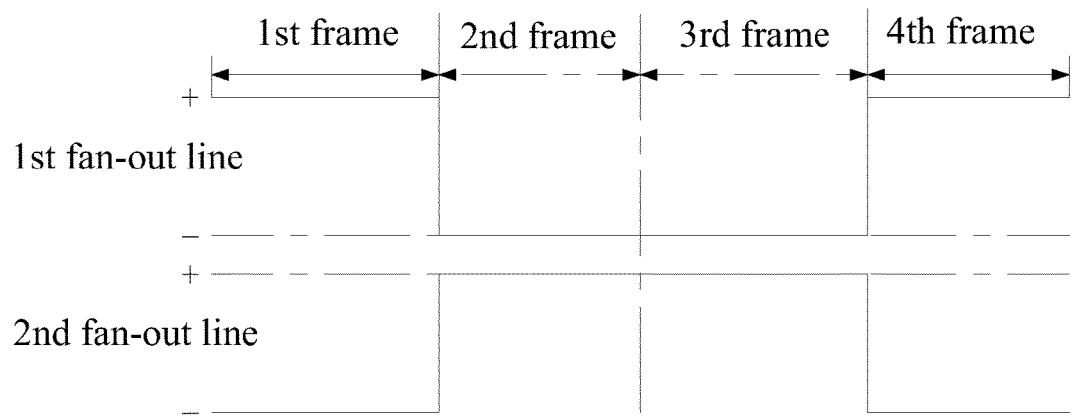
FIG. 6 is a schematic view showing the voltage parity of two adjacent fan-out lines of the LCD in FIG. 1 and the dot inversion LCD panel provided by an embodiment of the present invention.
Figure 7:
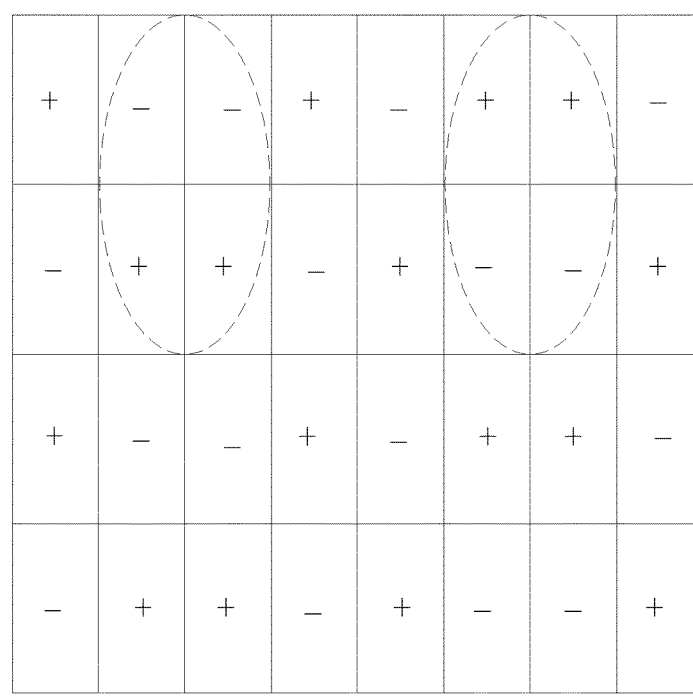
FIG. 7 is a schematic view showing the stacked up effect of the two adjacent frames of the LCD panel in FIG. 1.
Figures 10, 11:
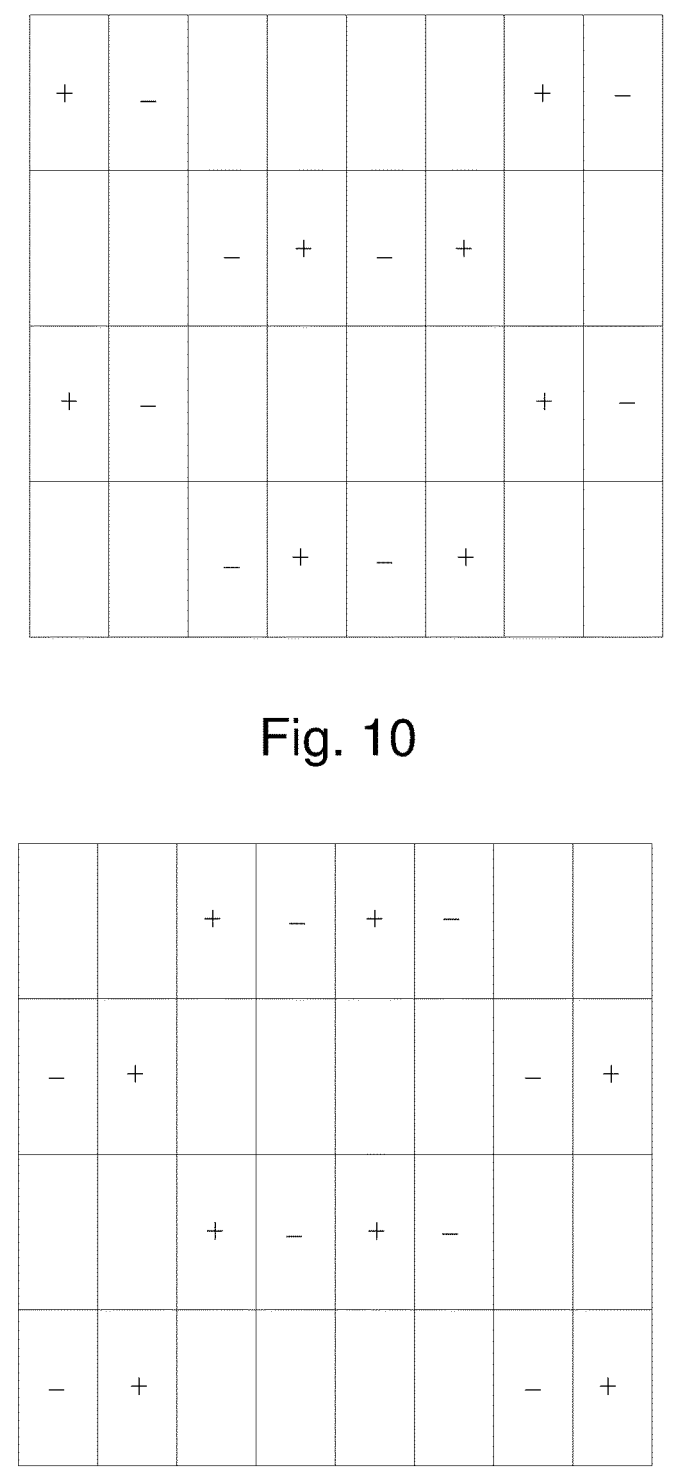
Figure 12:
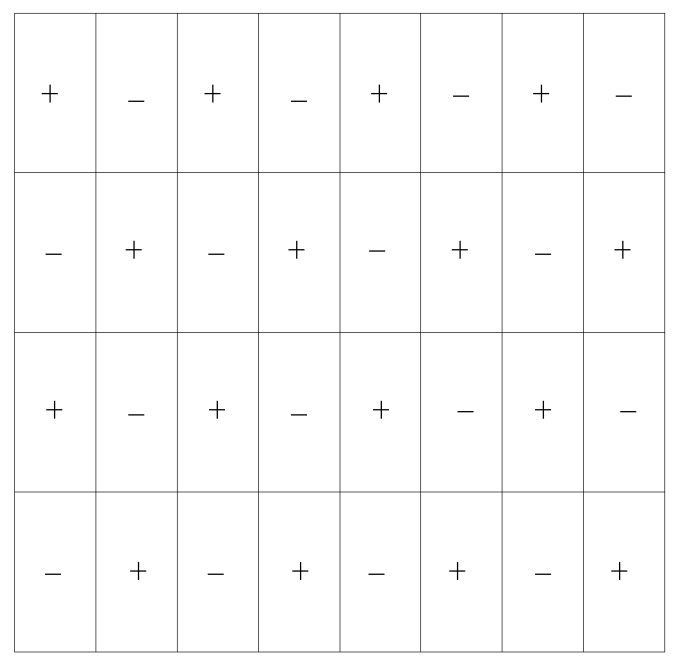

The first embodiment operates under the operation timing shown in FIG. 5 and the voltage parity change of the fan-out line shown in FIG. 6. For a positive integer m, the odd-numbered gate scan lines (G(1), G(3), . . . G(n−1)) of the m-th frame are turned on line-by-line, following by the even-numbered gate scan lines (G(2), G(4), G(n)) of the (m+1)-th frame turned on line-by-line; in two adjacent frames, the same fan-out line has opposite parities. Therefore, because the four data lines controlled by the same fan-out line have the same voltage parity, as shown in FIG. 10, in m-th frame, the first, second, seventh, and eighth T1, T2, T7, T8 in the (n−1)-th columns (i.e. odd-numbered columns) are turned on so that the first and the seventh sub-pixels of the (n−1)-th columns show positive parity, and the second and the eighth sub-pixels show negative parity. At the same time, the third, fourth, fifth, and sixth T3, T4, T5, T6 in the n-th columns (i.e. even-numbered columns) are turned on so that the fourth and the sixth sub-pixels of the n-th columns show positive parity, and the third and the fifth sub-pixels show negative parity. As shown in FIG. 11, in (m+1)-th frame, the first, second, seventh, and eighth T1, T2, T7, T8 in the n-th columns are turned on so that the second and the eighth sub-pixels of the n-th columns show positive parity, and the first and the seventh sub-pixels show negative parity. At the same time, the third, fourth, fifth, and sixth T3, T4, T5, T6 in the (n−1)-th columns are turned on so that the third and the fifth sub-pixels of the (n−1)-th columns show positive parity, and the fourth and the sixth sub-pixels show negative parity. As shown in FIG. 12, the stacked up voltage parity of the two adjacent frames (m-th, (m+1)-th frames) completely realize the dot inversion mode.

Figure 13:
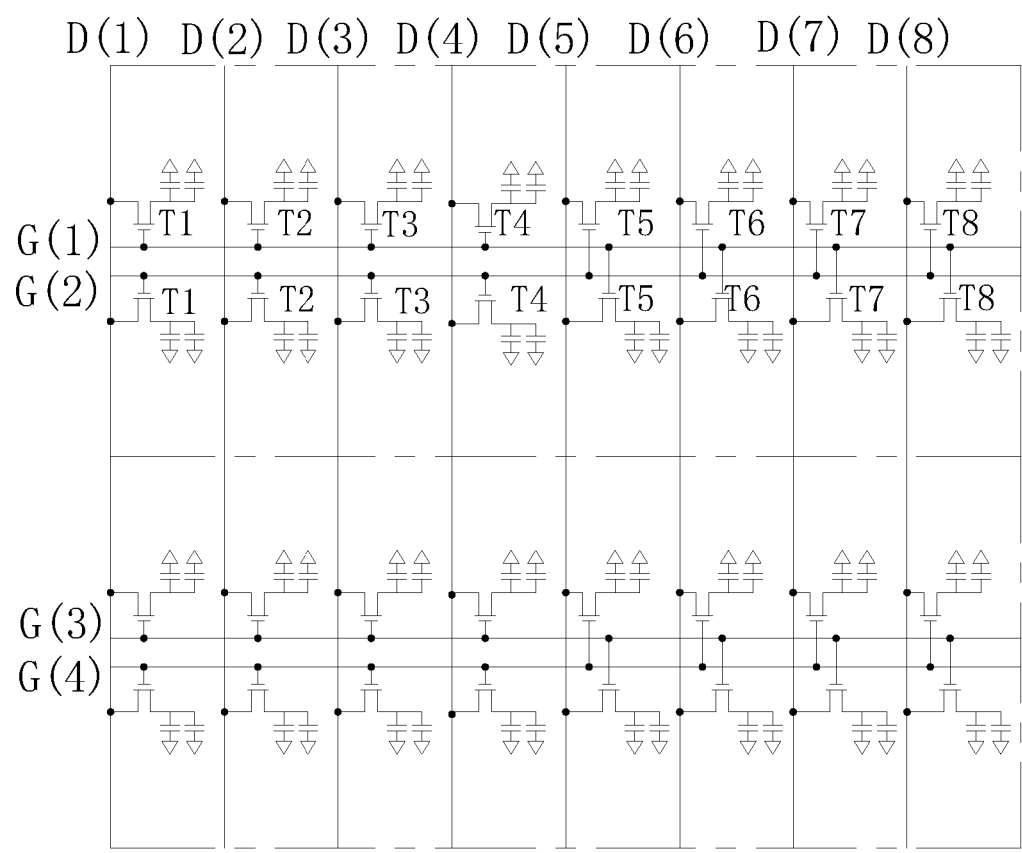
FIG. 13 is a schematic view showing the routing of the second embodiment of the dot inversion LCD panel provided by an embodiment of the present invention.
Figure 14:
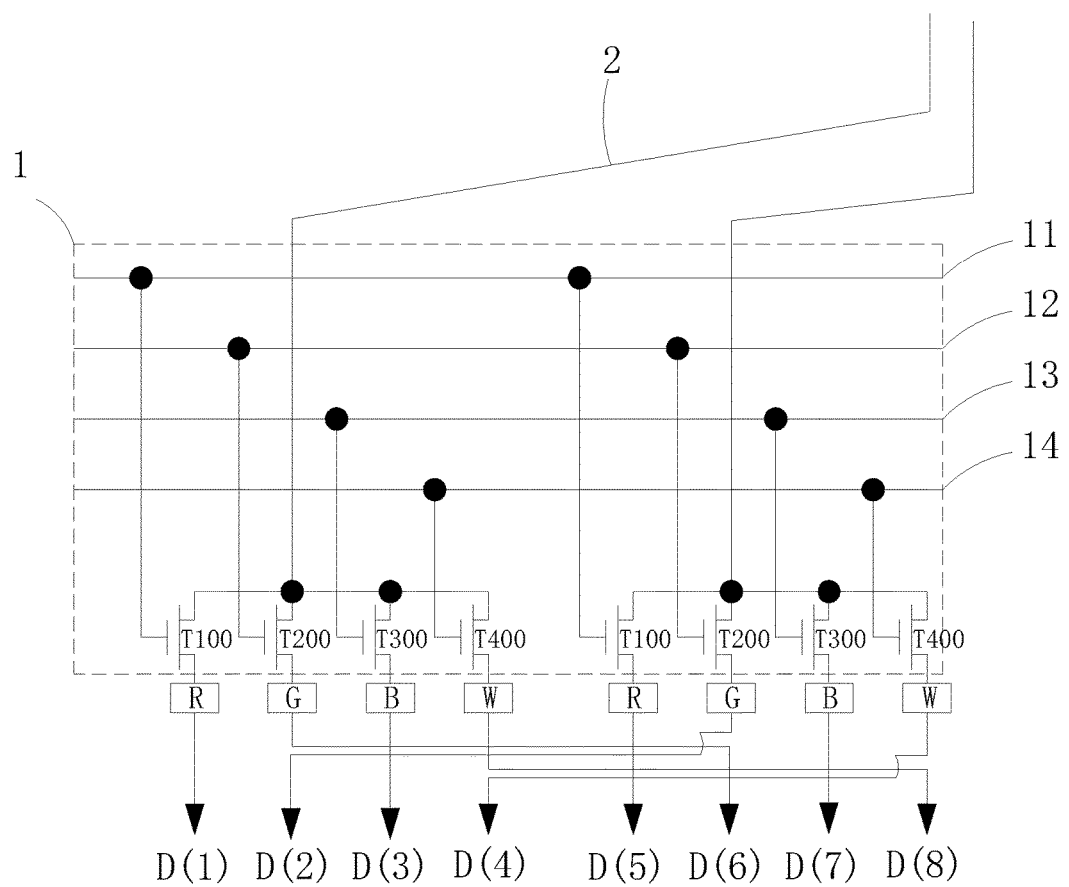
FIG. 14 is a schematic view showing the routing of the de-multiplexer of the second embodiment of the dot inversion LCD panel provided by an embodiment of the present invention.

Refer to FIG. 13 and FIG. 14 for the second embodiment of the present invention. The second embodiment differs from the first embodiment in that:

The gates of the first, second, third, and fourth TFTs T1, T2, T3, T4 of the (n−1)-th column connected to the (n−1)-th gate scan line G(n−1), and the gates of the fifth, sixth, seventh, and eighth TFTs T5, T6, T7, T8 of the (n−1)-th column connected to the n-th gate scan line G(n); the gates of the first, second, third, and fourth TFTs T1, T2, T3, T4 of the n-th column connected to the n-th gate scan line G(n), and the gates of the fifth, sixth, seventh, and eighth TFTs T5, T6, T7, T8 of the n-th column connected to the (n−1)-th gate scan line G(n−1); and A jumper design is disposed at the end of the demux 1, with respect to the two switch control sets, the drain of the first switch TFT T100 of the left switch control set connected correspondingly to the first data line D(1), the drain of the second switch TFT T200 jumped to connect to the sixth data line D(6), the drain of the third switch TFT T300 connected correspondingly to the third data line D(3), the drain of the fourth switch TFT T400 jumped to connect to the eighth data line D(8); the drain of the first switch TFT T100 of the right switch control set connected correspondingly to the fifth data line D(5), the drain of the second switch TFT T200 jumped to connect to the second data line D(2), the drain of the third switch TFT T300 connected correspondingly to the seventh data line D(7), the drain of the fourth switch TFT T400 jumped to connect to the fourth data line D(4).

The remaining structure is the same as the first embodiment, and the description will not be repeated here.

Figures 15, 16:
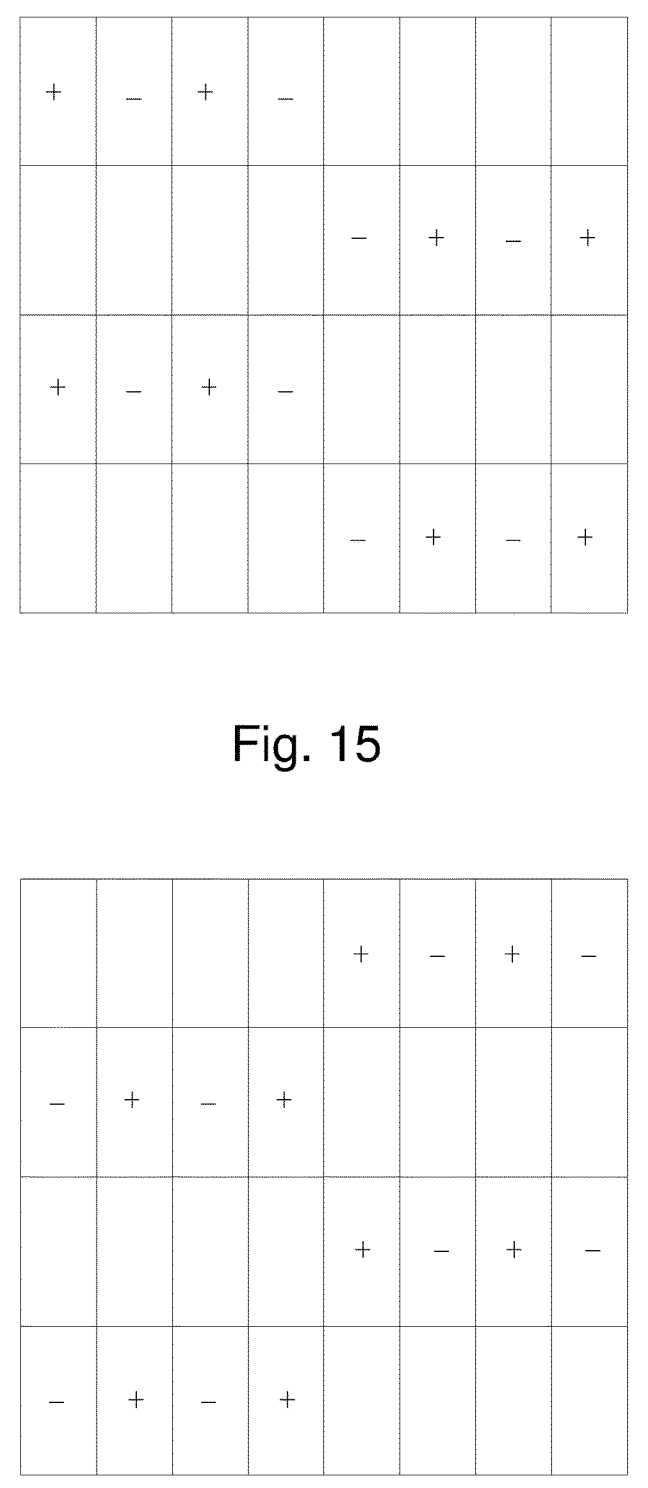
Figure 17:
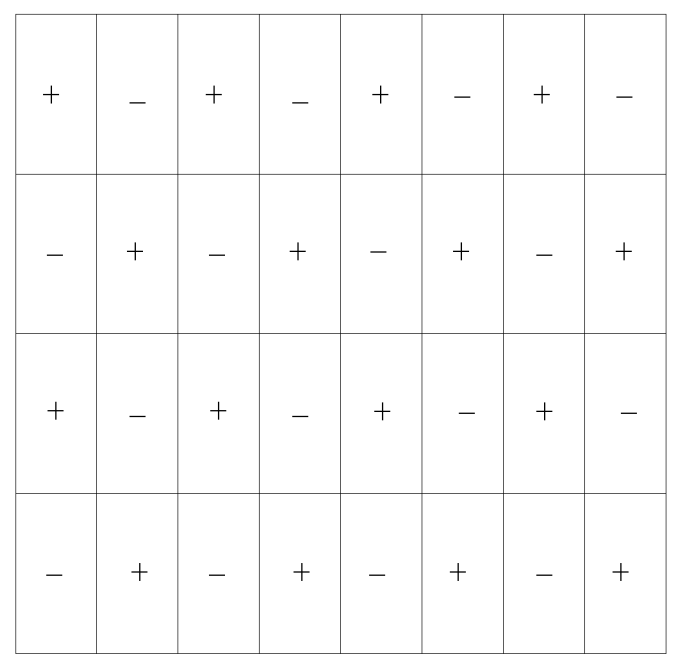

The second embodiment operates under the operation timing shown in FIG. 5 and the voltage parity change of the fan-out line shown in FIG. 6. For a positive integer m, the odd-numbered gate scan lines (G(1), G(3), . . . G(n−1)) of the m-th frame are turned on line-by-line, following by the even-numbered gate scan lines (G(2), G(4), G(n)) of the (m+1)-th frame turned on line-by-line; in two adjacent frames, the same fan-out line has opposite parities. Therefore, because the four data lines controlled by the same fan-out line have the same voltage parity, as shown in FIG. 15, in m-th frame, the first, second, third, and fourth T1, T2, T3, T4 in the (n−1)-th columns (i.e. odd-numbered columns) are turned on so that the first and the third sub-pixels of the (n−1)-th columns show positive parity, and the second and the fourth sub-pixels show negative parity. At the same time, the fifth, sixth, seventh, and eighth T5, T6, T7, T8 in the n-th columns (i.e. even-numbered columns) are turned on so that the sixth and the eighth sub-pixels of the n-th columns show positive parity, and the fifth and the seventh sub-pixels show negative parity. As shown in FIG. 16, in (m+1)-th frame, the first, second, third, and fourth T1, T2, T3, T4 in the n-th columns are turned on so that the second and the fourth sub-pixels of the n-th columns show positive parity, and the first and the third sub-pixels show negative parity. At the same time, the fifth, sixth, seventh, and eighth T5, T6, T7, T8 in the (n−1)-th columns are turned on so that the fifth and the seventh sub-pixels of the (n−1)-th columns show positive parity, and the sixth and the eighth sub-pixels show negative parity. As shown in FIG. 17, the stacked up voltage parity of the two adjacent frames (m-th, (m+1)-th frames) completely realize the dot inversion mode.

Figure 18:
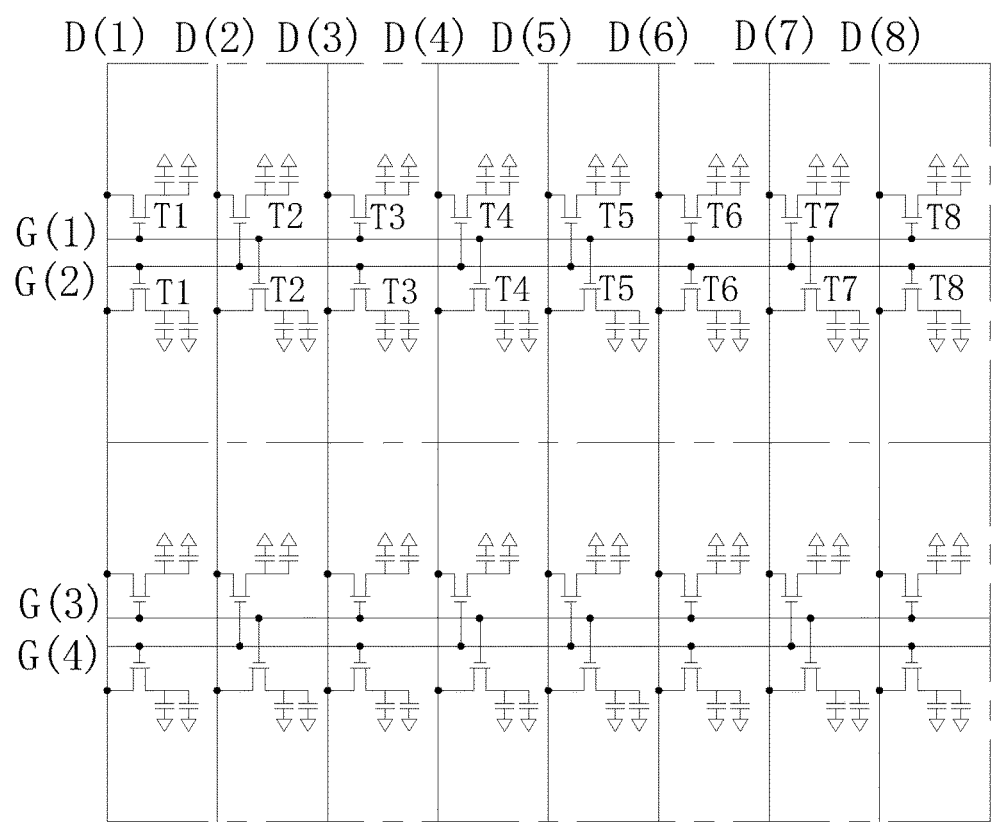
FIG. 18 is a schematic view showing the routing of the third embodiment of the dot inversion LCD panel provided by an embodiment of the present invention.
Figure 19:
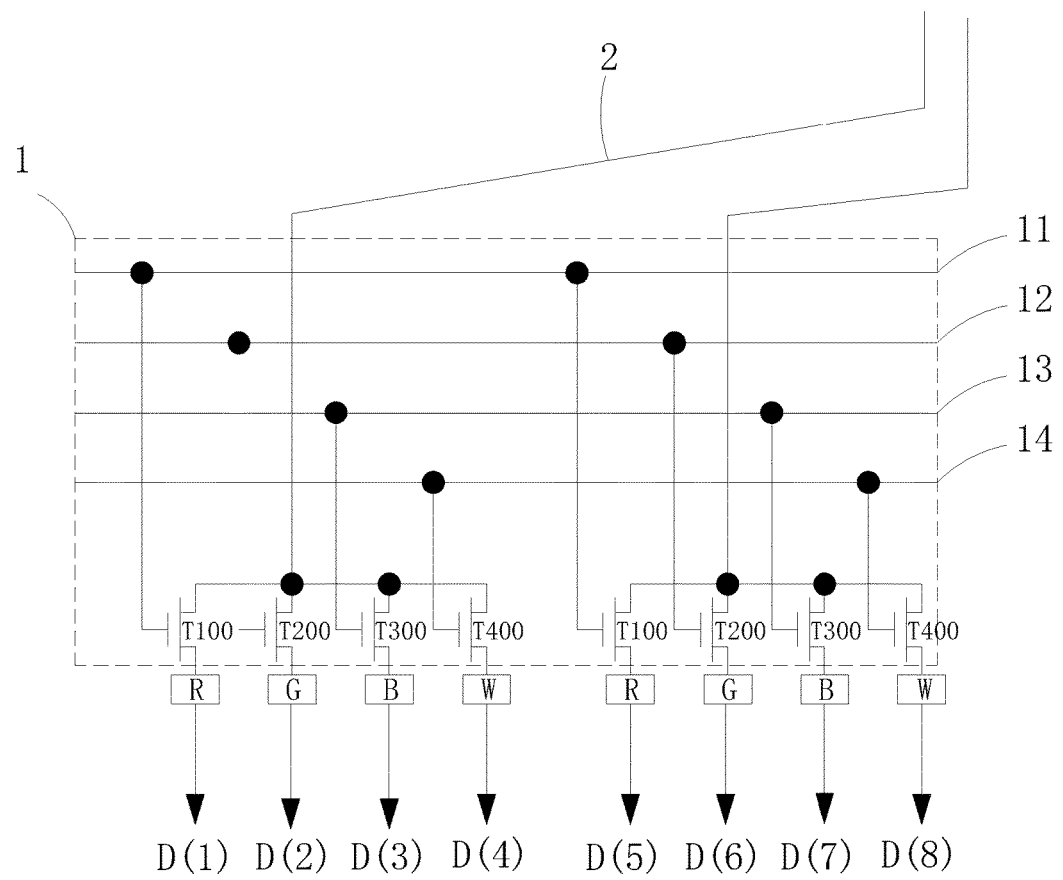
FIG. 19 is a schematic view showing the routing of the de-multiplexer of the third embodiment of the dot inversion LCD panel provided by an embodiment of the present invention.

Refer to FIG. 18 and FIG. 19 for the third embodiment of the present invention. The third embodiment differs from the first embodiment in that:

The gates of the first, third, sixth, and eighth TFTs T1, T3, T6, T8 of the (n−1)-th column connected to the (n−1)-th gate scan line G(n−1), and the gates of the second, fourth, fifth, and seventh TFTs T2, T4, T5, T7 of the (n−1)-th column connected to the n-th gate scan line G(n); the gates of the first, third, sixth, and eighth TFTs T1, T3, T6, T8 of the n-th column connected to the n-th gate scan line G(n), and the gates of the second, fourth, fifth, and seventh TFTs T2, T4, T5, T7 of the n-th column connected to the (n−1)-th gate scan line G(n−1); and A jumper design is disposed at the end of the demux 1, with respect to the two switch control sets, the drain of the first switch TFT T100 of the left switch control set connected correspondingly to the first data line D(1), the drain of the second switch TFT T200 connected correspondingly to the second data line D(2), the drain of the third switch TFT T300 connected correspondingly to the third data line D(3), the drain of the fourth switch TFT T400 connected correspondingly to the eighth data line D(4); the drain of the first switch TFT T100 of the right switch control set connected correspondingly to the fifth data line D(5), the drain of the second switch TFT T200 connected correspondingly to the sixth data line D(6), the drain of the third switch TFT T300 connected correspondingly to the seventh data line D(7), the drain of the fourth switch TFT T400 connected correspondingly to the fourth data line D(8).

The remaining structure is the same as the first embodiment, and the description will not be repeated here.

Figures 20, 21:
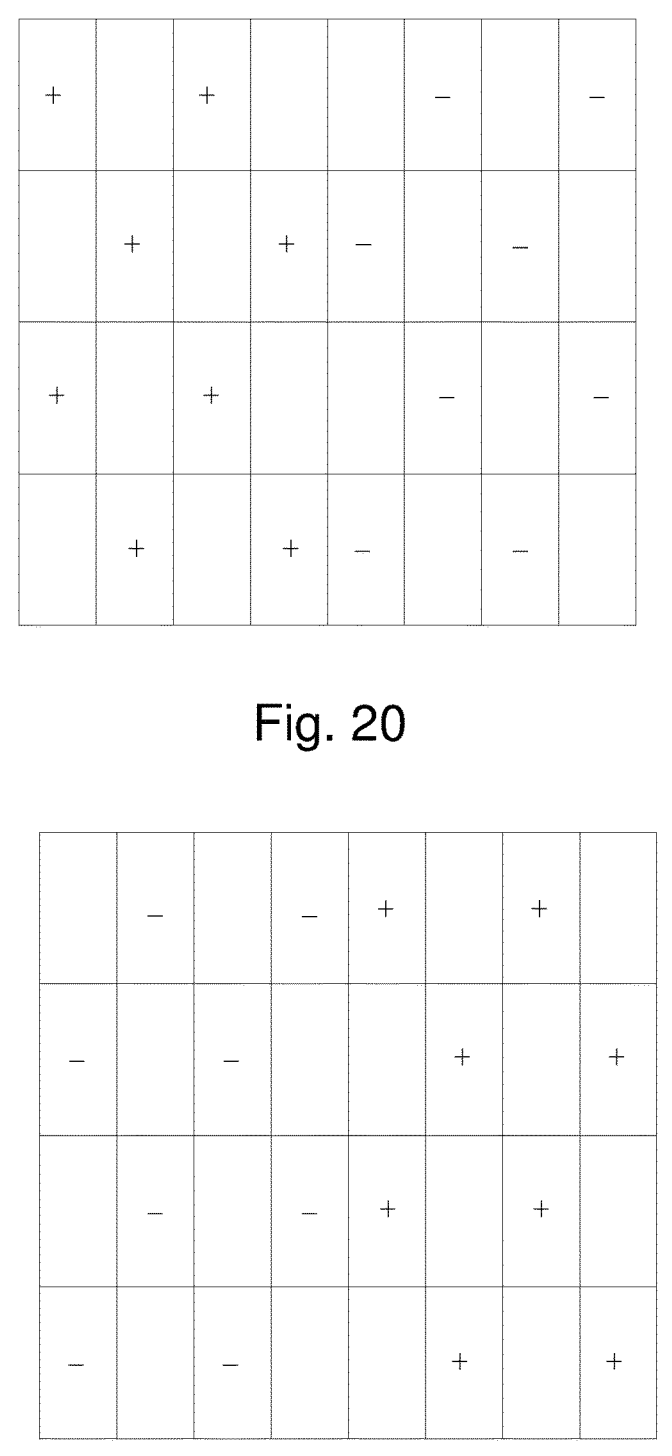
Figure 22:
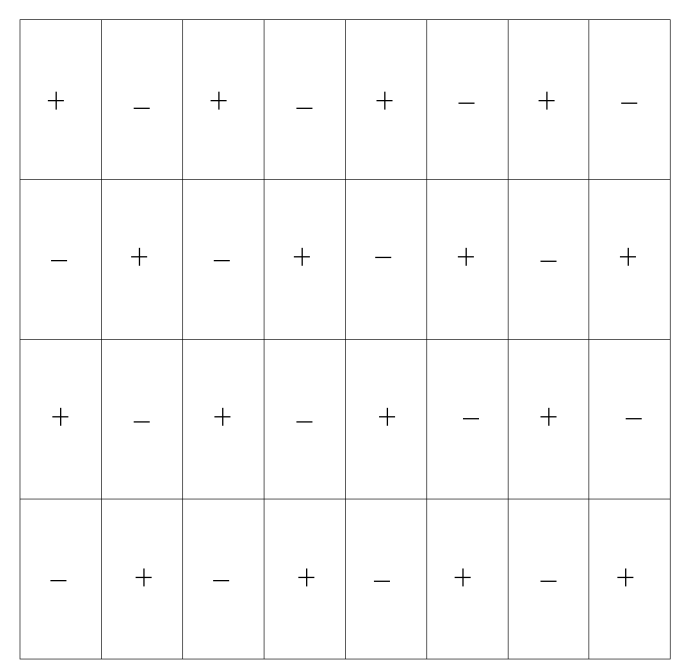

The third embodiment operates under the operation timing shown in FIG. 5 and the voltage parity change of the fan-out line shown in FIG. 6. For a positive integer m, the odd-numbered gate scan lines (G(1), G(3), . . . G(n−1)) of the m-th frame are turned on line-by-line, following by the even-numbered gate scan lines (G(2), G(4), G(n)) of the (m+1)-th frame turned on line-by-line; in two adjacent frames, the same fan-out line has opposite parities. Therefore, because the four data lines controlled by the same fan-out line have the same voltage parity, as shown in FIG. 20, in m-th frame, the first, third, sixth, and eighth TFTs T1, T3, T6, T8 in the (n−1)-th columns (i.e. odd-numbered columns) are turned on so that the first and the third sub-pixels of the (n−1)-th columns show positive parity, and the sixth and the eighth sub-pixels show negative parity. At the same time, the second, fourth, fifth, and seventh TFTs T2, T4, T5, T7 in the n-th columns (i.e. even-numbered columns) are turned on so that the second and the fourth sub-pixels of the n-th columns show positive parity, and the fifth and the seventh sub-pixels show negative parity. As shown in FIG. 21, in (m+1)-th frame, the first, third, sixth, and eighth TFTs T1, T3, T6, T8 in the n-th columns are turned on so that the sixth and the eighth sub-pixels of the n-th columns show positive parity, and the first and the third sub-pixels show negative parity. At the same time, the second, fourth, fifth, and seventh TFTs T2, T4, T5, T7 in the (n−1)-th columns are turned on so that the fifth and the seventh sub-pixels of the (n−1)-th columns show positive parity, and the second and the fourth sub-pixels show negative parity. As shown in FIG. 22, the stacked up voltage parity of the two adjacent frames (m-th, (m+1)-th frames) completely realize the dot inversion mode.

In summary, the present invention provides an LCD panel of dot inversion mode; without changing the source driving power-consumption, adjusting the routing inside the LCD panel: for an even number n, the adjacent (n−1)-th gate scan line and the n-th gate scan line are disposed closely with TFTs of the (n−1)-th column located above the (n−1)-th gate scan line, and TFTs of the n-th column located below the n-th gate scan line; the gates of part of the TFTs of the (n−1)-th column and the n-th column are connected to the (n−1)-th gate scan line, and the gates of part of the TFTs of the (n−1)-th column and the n-th column are connected to the n-th gate scan line; in combination with the jumper design on the end of the de-multiplexer to change the parity inversion mode of the LCD panel to achieve dot inversion mode. As such, the present invention can overcome the flicker and crosstalk problems and improve the LCD panel display quality.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display (LCD) panel of dot inversion mode, which comprises: a plurality of parallel horizontal gate scan lines, a plurality of parallel vertical data lines a plurality of thin film transistors (TFT) arranged in an array to drive corresponding sub-pixels, and a de-multiplexer (demux); wherein:

for a positive number s, the TFTs of the s-th rows having sources connected to the s-th data line;

for an even number n, the adjacent (n−1)-th gate scan line and the n-th gate scan line being disposed closely with TFTs of the (n−1)-th column located above the (n−1)-th gate scan line, and TFTs of the n-th column located below the n-th gate scan line; every eight rows of the same column of TFTs being grouped as a set from left to right, the gates of the first, second, seventh and eighth TFTs of the (n−1)-th column connected to the (n−1)-th gate scan line, and the gates of the third, fourth, fifth and sixth TFTs of the (n−1)-th column connected to the n-th gate scan line; the gates of the first, second, seventh and eighth TFTs of the n-th column connected to the n-th gate scan line, and the gates of the third, fourth, fifth and sixth TFTs of the n-th column connected to the (n−1)-th gate scan line;

the demux comprising a first routing, a second routing, a third routing, and a fourth routing, and a plurality of control switch sets; each control switch set comprising, from left to right, a first switch TFT, a second switch TFT, a third switch TFT and a fourth switch TFT, the gates of the four switch TFTs of the same switch control set connected together to a routing, the sources connected together to a fan-out line, the drains connected together to a data line; two adjacent fan-out lines having opposite voltage parities; and every two adjacent switch control sets of the demux corresponding to the eight data lines, arranged from left to right; a jumper design disposed at the end of the demux, with respect to the two switch control sets, the drain of the first switch TFT of the left switch control set connected correspondingly to the first data line, the drain of the second switch TFT jumped to connect to the seventh data line, the drain of the third switch TFT jumped to connect to the sixth data line, the drain of the fourth switch TFT jumped to connect corresponding to the fourth data line; the drain of the first switch TFT of the right switch control set connected correspondingly to the fifth data line, the drain of the second switch TFT jumped to connect to the third data line, the drain of the third switch TFT jumped to connect to the second data line, the drain of the fourth switch TFT jumped to connect corresponding to the eighth data line.

2. The LCD panel of dot inversion mode as claimed in claim 1, wherein for a positive integer m, the odd-numbered gate scan lines of the m-th frame are turned on line-by-line, following by the even-numbered gate scan lines of the (m+1)-th frame turned on line-by-line; in two adjacent frames, the same fan-out line has opposite parities.

3. The LCD panel of dot inversion mode as claimed in claim 1, wherein the sub-pixels comprise a red sub-pixel, a green sub-pixel, a blue sub-pixel, and a white sub-pixel.

4. A liquid crystal display (LCD) panel of dot inversion mode, which comprises: a plurality of parallel horizontal gate scan lines, a plurality of parallel vertical data lines a plurality of thin film transistors (TFT) arranged in an array to drive corresponding sub-pixels, and a de-multiplexer (demux); wherein:

for a positive number s, the TFTs of the s-th rows having sources connected to the s-th data line;

for an even number n, the adjacent (n−1)-th gate scan line and the n-th gate scan line being disposed closely with TFTs of the (n−1)-th column located above the (n−1)-th gate scan line, and TFTs of the n-th column located below the n-th gate scan line; every eight rows of the same column of TFTs being grouped as a set from left to right, the gates of the first, second, third and fourth TFTs of the (n−1)-th column connected to the (n−1)-th gate scan line, and the gates of the fifth, sixth, seventh, and eighth TFTs of the (n−1)-th column connected to the n-th gate scan line; the gates of the first, second, third, and fourth TFTs of the n-th column connected to the n-th gate scan line, and the gates of the fifth, sixth, seventh, and eighth TFTs of the n-th column connected to the (n−1)-th gate scan line;

the demux comprising a first routing, a second routing, a third routing, and a fourth routing, and a plurality of control switch sets; each control switch set comprising, from left to right, a first switch TFT, a second switch TFT, a third switch TFT and a fourth switch TFT, the gates of the four switch TFTs of the same switch control set connected together to a routing, the sources connected together to a fan-out line, the drains connected together to a data line; two adjacent fan-out lines having opposite voltage parities; and every two adjacent switch control sets of the demux corresponding to the eight data lines, arranged from left to right; a jumper design disposed at the end of the demux, with respect to the two switch control sets, the drain of the first switch TFT of the left switch control set connected correspondingly to the first data line, the drain of the second switch TFT jumped to connect to the sixth data line, the drain of the third switch TFT connected correspondingly to the third data line, the drain of the fourth switch TFT jumped to connect to the eighth data line; the drain of the first switch TFT of the right switch control set connected correspondingly to the fifth data line, the drain of the second switch TFT jumped to connect to the second data line, the drain of the third switch TFT connected correspondingly to the seventh data line, the drain of the fourth switch TFT jumped to connect to the fourth data line.

5. The LCD panel of dot inversion mode as claimed in claim 4, wherein for a positive integer m, the odd-numbered gate scan lines of the m-th frame are turned on line-by-line, following by the even-numbered gate scan lines of the (m+1)-th frame turned on line-by-line; in two adjacent frames, the same fan-out line has opposite parities.

6. The LCD panel of dot inversion mode as claimed in claim 4, wherein the sub-pixels comprise a red sub-pixel, a green sub-pixel, a blue sub-pixel, and a white sub-pixel.

7. A liquid crystal display (LCD) panel of dot inversion mode, which comprises: a plurality of parallel horizontal gate scan lines, a plurality of parallel vertical data lines a plurality of thin film transistors (TFT) arranged in an array to drive corresponding sub-pixels, and a de-multiplexer (demux); wherein:

for a positive number s, the TFTs of the s-th rows having sources connected to the s-th data line;

for an even number n, the adjacent (n−1)-th gate scan line and the n-th gate scan line being disposed closely with TFTs of the (n−1)-th column located above the (n−1)-th gate scan line, and TFTs of the n-th column located below the n-th gate scan line; every eight rows of the same column of TFTs being grouped as a set from left to right, the gates of the first, third, sixth and eighth TFTs of the (n−1)-th column connected to the (n−1)-th gate scan line, and the gates of the second, fourth, fifth, and seventh TFTs of the (n−1)-th column connected to the n-th gate scan line; the gates of the first, third, sixth and eighth TFTs of the n-th column connected to the n-th gate scan line, and the gates of the second, fourth, fifth, and seventh TFTs of the n-th column connected to the (n−1)-th gate scan line;

the demux comprising a first routing, a second routing, a third routing, and a fourth routing, and a plurality of control switch sets; each control switch set comprising, from left to right, a first switch TFT, a second switch TFT, a third switch TFT and a fourth switch TFT, the gates of the four switch TFTs of the same switch control set connected together to a routing, the sources connected together to a fan-out line, the drains connected together to a data line; two adjacent fan-out lines having opposite voltage parities; and every two adjacent switch control sets of the demux corresponding to the eight data lines, arranged from left to right; a jumper design disposed at the end of the demux, with respect to the two switch control sets, the drain of the first switch TFT of the left switch control set connected correspondingly to the first data line, the drain of the second switch TFT connected correspondingly to the second data line, the drain of the third switch TFT connected correspondingly to the third data line, the drain of the fourth switch TFT connected correspondingly the fourth data line; the drain of the first switch TFT of the right switch control set connected correspondingly to the fifth data line, the drain of the second switch TFT connected correspondingly to the sixth data line, the drain of the third switch TFT connected correspondingly to the seventh data line, the drain of the fourth switch TFT connected correspondingly to the eighth data line.

8. The LCD panel of dot inversion mode as claimed in claim 7, wherein for a positive integer m, the odd-numbered gate scan lines of the m-th frame are turned on line-by-line, following by the even-numbered gate scan lines of the (m+1)-th frame turned on line-by-line; in two adjacent frames, the same fan-out line has opposite parities.

9. The LCD panel of dot inversion mode as claimed in claim 7, wherein the sub-pixels comprise a red sub-pixel, a green sub-pixel, a blue sub-pixel, and a white sub-pixel.

\* \* \* \* \*